(12) United States Patent
Yonezawa et al.

(10) Patent No.: US 11,186,270 B2
(45) Date of Patent: Nov. 30, 2021

(54) HYBRID VEHICLE AND METHOD OF CONTROLLING THE SAME

(71) Applicant: TOYOTA JIDOSHA KABUSHIKI KAISHA, Toyota (JP)

(72) Inventors: Koichi Yonezawa, Toyota (JP); Satoshi Yoshizaki, Gotenba (JP); Osamu Maeda, Toyota (JP); Daigo Ando, Nagoya (JP); Yoshikazu Asami, Gotenba (JP); Kenji Itagaki, Shizuoka-ken (JP); Shunsuke Oyama, Nagakute (JP); Koichiro Muta, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 78 days.

(21) Appl. No.: 16/829,122

(22) Filed: Mar. 25, 2020

(65) Prior Publication Data

US 2020/0307550 A1 Oct. 1, 2020

(30) Foreign Application Priority Data

Mar. 29, 2019 (JP) .............................. JP2019-066624

(51) Int. Cl.
*B60W 20/50* (2016.01)
*B60W 20/40* (2016.01)
(Continued)

(52) U.S. Cl.
CPC ............ *B60W 20/50* (2013.01); *B60W 20/40* (2013.01); *B60W 50/0225* (2013.01);
(Continued)

(58) Field of Classification Search
CPC .. B60W 20/50; B60W 20/40; B60W 50/0225; F02D 41/083; F02D 41/1444; F02D 2041/227
See application file for complete search history.

(56) References Cited

U.S. PATENT DOCUMENTS 5,905,193 A * 5/1999 Hashizume ........... F02D 35/027
73/35.09
10,823,098 B1 * 11/2020 Bayer ................... F02D 35/027
(Continued)

FOREIGN PATENT DOCUMENTS

JP 2015-058924 A 3/2015
JP 2017-002781 A 1/2017
(Continued)

*Primary Examiner* — Ramsey Refai
(74) *Attorney, Agent, or Firm* — Sughrue Mion, PLLC

(57) ABSTRACT

A vehicle includes an engine including a forced induction device, a knock sensor and a crank angle sensor that detect an occurrence of LSPI, a battery that supplies electric power to a second motor generator, and an ECU. When an occurrence of the LSPI is detected, the ECU restricts a maximum torque, which can be output by the engine with the forced induction device, more than when an occurrence of the LSPI is not detected to prevent an engine operating point from being included in an LSPI area, and when an output of the engine becomes insufficient along with the restriction on the maximum torque, the engine compensates for an amount of the insufficient output with electric power supplied from the battery.

4 Claims, 6 Drawing Sheets

(51) Int. Cl.
*F02D 41/08* (2006.01)
*F02D 41/14* (2006.01)
*B60W 50/02* (2012.01)
*F02D 41/22* (2006.01)

(52) U.S. Cl.
CPC ....... *F02D 41/083* (2013.01); *F02D 41/1444* (2013.01); *F02D 2041/227* (2013.01)

(56) References Cited

U.S. PATENT DOCUMENTS

| | | | |
|---|---|---|---|
| 2012/0186225 A1* | 7/2012 | Amann | F02P 5/152 |
| | | | 60/274 |
| 2013/0047956 A1* | 2/2013 | Davis | F02D 41/0007 |
| | | | 123/406.11 |
| 2016/0363033 A1 | 12/2016 | Kitayama et al. | |
| 2017/0051688 A1* | 2/2017 | Glugla | F02D 35/027 |
| 2017/0328333 A1* | 11/2017 | Attard | F02P 17/12 |

FOREIGN PATENT DOCUMENTS

| | | |
|---|---|---|
| JP | 2019-504920 A | 2/2019 |
| WO | 2017/137519 A1 | 8/2017 |

* cited by examiner

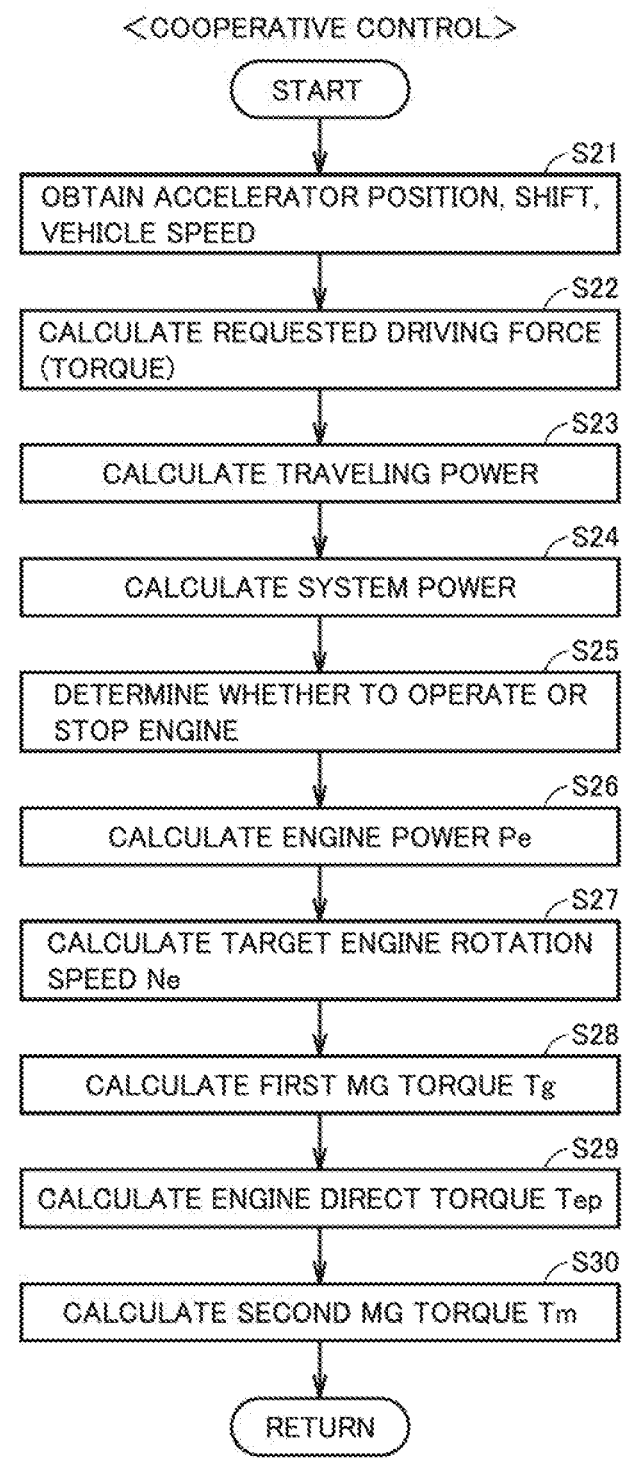

HYBRID VEHICLE AND METHOD OF CONTROLLING THE SAME

This nonprovisional application is based on Japanese Patent Application No. 2019-066624 filed on Mar. 29, 2019 with the Japan Patent Office, the entire contents of which are hereby incorporated by reference.

BACKGROUND

Field

The present disclosure relates to a hybrid vehicle and a method of controlling the same, and more particularly, to a hybrid vehicle including an internal-combustion engine with a forced induction device and a method of controlling the hybrid vehicle.

Description of the Background Art

In recent years, the introduction of an internal-combustion engine with a forced induction device has progressed. Increasing torque in a low-rotation area by the forced induction device can reduce displacement while maintaining equal power, thus improving fuel consumption of a vehicle. For example, the hybrid vehicle disclosed in Japanese Patent Laying-Open No. 2015-58924 includes an internal-combustion engine with a turbo forced induction device, and a motor generator.

SUMMARY

Sporadic abnormal combustion, referred to as low speed pre-ignition (LSPI), is known. In LSPI, for example, a drop of oil which has scattered from a wall surface of a cylinder into a combustion chamber, a deposit which has peeled off from the wall surface of the cylinder through combustion, or a deposit which has peeled off from an intake port and flowed into the combustion chamber serves as an ignition source and causes ignition before an air-fuel mixture is ignited by an ignition plug. LSPI causes torque fluctuation and strange sound, which may lead to exacerbated comfort of a vehicle. Also, repeated occurrence of LSPI may lead to further deterioration of an internal-combustion engine. LSPI is likely to occur particularly in a low-rotation, high-load area. Thus, LSPI is likely to occur when an output torque is increased in a low-rotation area in an internal-combustion engine with a forced induction device.

It is known that the addition of an octane booster to fuel increases an octane rating of the fuel, resulting in a satisfactory knock resistance of the fuel. On the other hand, when the octane booster of an amount required for increasing the octane rating is added to the fuel, the distillation profile of the fuel changes, which may increase a maximum distillation temperature of the fuel. An amount of generated hydrocarbon exhaust gas increases at a higher maximum distillation temperature, so that LSPI may be more likely to occur (see Japanese National Patent Publication No. 2019-504920). Japanese Patent Laying-Open No. 2015-58924 does not particularly describe a study on a problem associated with such properties (the presence or absence of an added octane booster) of the fuel.

The present disclosure has been made to solve such a problem, and an object of the present disclosure is to restrain an excessive occurrence of LSPI in accordance with the properties of fuel in a hybrid vehicle including an internal-combustion engine with a forced induction device.

(1) A hybrid vehicle according to an aspect of the present disclosure includes an engine that includes a forced induction device and serves as a motive power source of the hybrid vehicle, a sensor that detects an occurrence of low speed pre-ignition in the engine, a rotating electric machine that serves as a motive power source of the hybrid vehicle, a power storage device that supplies electric power to the rotating electric machine, and a controller that controls the engine and the rotating electric machine. When an occurrence of the low speed pre-ignition is detected, the controller restricts a maximum torque more than when an occurrence of the low speed pre-ignition is not detected to prevent an operating point of the engine from moving into (being included in) a predetermined area. The predetermined area is an area with low rotation and high load in which the low speed pre-ignition is likely to occur. When an output of the engine becomes insufficient along with the restriction on the maximum torque, the controller compensates for an amount of the insufficient output with electric power supplied from the power storage device, where the maximum torque is capable of being output by the engine with the forced induction device.

(2) When an occurrence of the low speed pre-ignition is detected, the controller sets a control upper limit of electric power that can be supplied to the rotating electric machine from the power storage device to be higher than when an occurrence of the low speed pre-ignition is not detected.

(3) The controller determines that an occurrence of the low speed pre-ignition is detected when at least one of a first condition and a second condition is satisfied. The first condition is a condition that a number of detections of the low speed pre-ignition from last refueling has exceeded a predetermined number of times. The second condition is a condition that a frequency of detections of the low speed pre-ignition in a predetermined period has exceeded a predetermined frequency.

(4) In a method of controlling a hybrid vehicle according to another aspect of the present disclosure, the hybrid vehicle includes an engine including a forced induction device, a rotating electric machine, and a power storage device that supplies electric power to the rotating electric machine. The method includes a first step and a second step. The first step is a step of detecting an occurrence of low speed pre-ignition in the engine. The second step is a step of, when the low speed pre-ignition is detected, restricting a maximum torque more than when the low speed pre-ignition is not detected such that an operating point of the engine does not move into a predetermined area. The predetermined area is an area with low rotation and high load in which the low speed pre-ignition is likely to occur. The maximum torque is capable of being output by the engine with the forced induction device. The second step (restricting) includes, when an output of the engine becomes insufficient along with the restriction on the maximum torque, compensating for an amount of the insufficient output with electric power supplied from the power storage device.

When an occurrence of LSPI is detected in the hybrid vehicle, fuel may be high manganese fuel, which will be described below in detail. When the operating point of the engine moves into an area in which LSPI has occurred (LSPI area which will be described below) during use of the high manganese fuel, a probability of occurrence of LSPI will increase further. In the configurations of (1) to (4) described above, thus, when an occurrence of LSPI is detected, a maximum torque that can be output by the engine is restricted more than in any other case (in normal state). Specifically, a maximum torque line lower than in normal state is set so as not to include the LSPI area. Consequently, the engine is controlled such that the torque output from the engine does not exceed the maximum torque line, thus avoiding movement of the operating point of the engine into the LSPI area. Thus, the configurations of (1) to (4) described above can restrain an excessive occurrence of LSPI.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 8 is a flowchart showing example cooperative control in the present embodiment.

DESCRIPTION OF THE PREFERRED EMBODIMENTS

Figure 1:
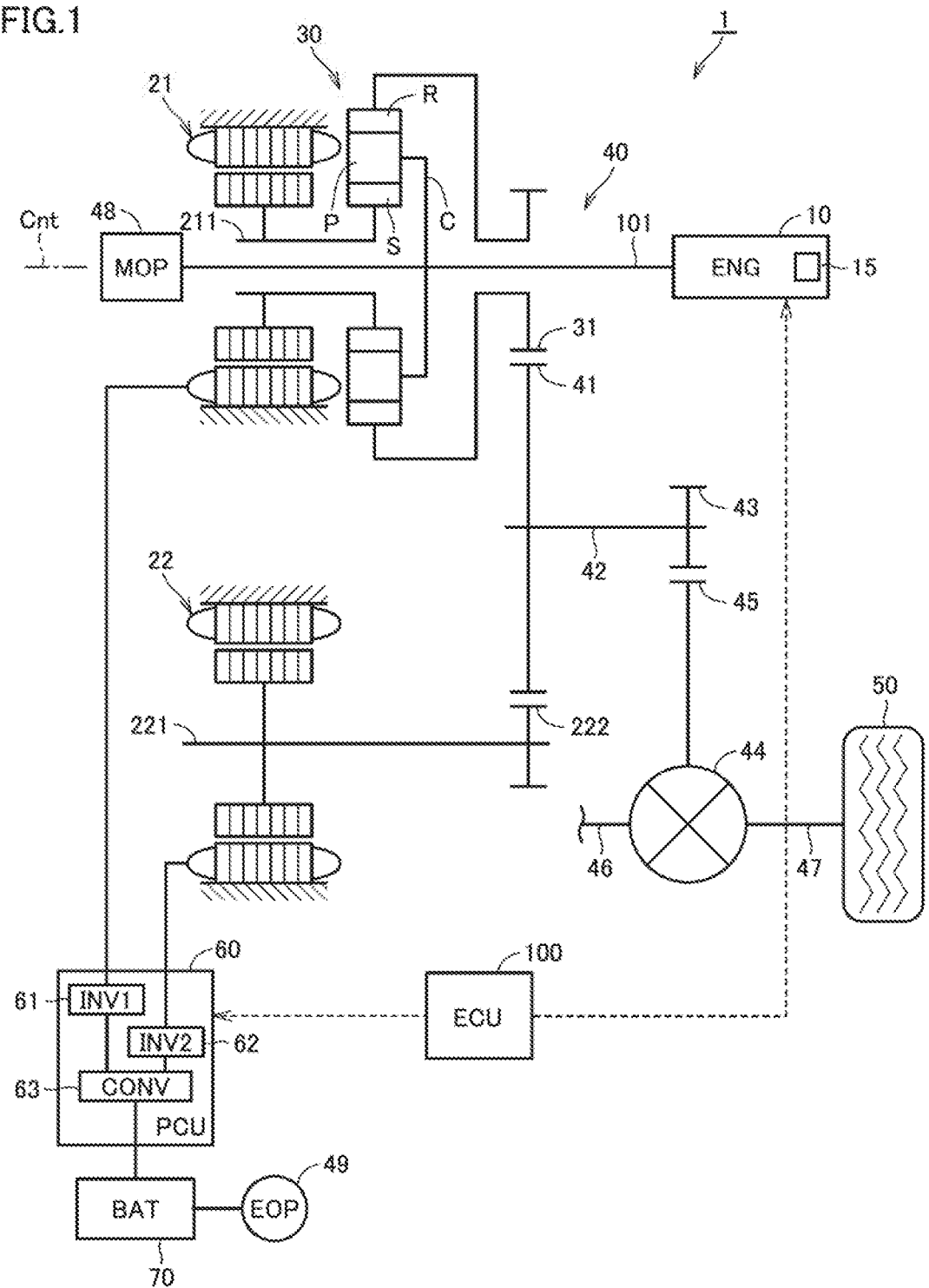
FIG. 1 shows a general configuration of a hybrid vehicle according to an embodiment of the present disclosure.

The present embodiment will now be described in detail with reference to the drawings. The same or corresponding elements will be designated by the same reference numerals in the drawings, the description of which will not be repeated.

[Embodiment]

<Configuration of Hybrid Vehicle>

FIG. 1 shows a general configuration of a hybrid vehicle according to an embodiment of the present disclosure. Referring to FIG. 1, a vehicle 1 is a hybrid vehicle and includes an engine 10, a first motor generator 21, a second motor generator 22, a planetary gear mechanism 30, a drive device 40, a driving wheel 50, a power control unit (PCU) 60, a battery 70, and an electronic control unit (ECU) 100.

Engine 10 is an internal-combustion engine, such as a gasoline engine. Engine 10 generates motive power for vehicle 1 to travel in accordance with a control signal from ECU 100.

Each of first motor generator 21 and second motor generator 22 is a permanent magnet synchronous motor or an induction motor. First motor generator 21 and second motor generator 22 have rotor shafts 211 and 221, respectively.

First motor generator 21 uses the electric power of battery 70 to rotate a crankshaft (not shown) of engine 10 at startup of engine 10. First motor generator 21 can also use the motive power of engine 10 to generate electric power. Alternating current (AC) power generated by first motor generator 21 is converted into direct current (DC) power by PCU 60, with which battery 70 is charged. AC power generated by first motor generator 21 may also be supplied to second motor generator 22.

Second motor generator 22 uses at least one of the electric power from battery 70 and the electric power generated by first motor generator 21 to rotate drive shafts 46 and 47 (which will be described below). Second motor generator 22 can also generate electric power by regenerative braking. AC power generated by second motor generator 22 is converted into DC power by PCU 60, with which battery 70 is charged. Second motor generator 22 corresponds to the "rotating electric machine" according to the present disclosure.

Planetary gear mechanism 30 is a single-pinion planetary gear mechanism and is arranged on an axis Cnt coaxial with an output shaft 101 of engine 10. Planetary gear mechanism 30 transmits a torque output from engine 10 while dividing the torque to first motor generator 21 and an output gear 31. Planetary gear mechanism 30 includes a sun gear S, a ring gear R, pinion gears P, and a carrier C.

Ring gear R is arranged coaxially with sun gear S. Pinion gears P mesh with sun gear S and ring gear R. Carrier C holds pinion gears P in a rotatable and revolvable manner. Each of engine 10 and first motor generator 21 is mechanically coupled to driving wheel 50 with planetary gear mechanism 30 therebetween. Output shaft 101 of engine 10 is coupled to carrier C. Rotor shaft 211 of first motor generator 21 is coupled to sun gear S. Ring gear R is coupled to output gear 31.

In planetary gear mechanism 30, carrier C functions as an input element, ring gear R functions as an output element, and sun gear S functions as a reaction force element. Carrier C receives a torque output from engine 10. Planetary gear mechanism 30 transmits a torque output from engine 10 to output shaft 101 while dividing the torque to sun gear S (and also first motor generator 21) and ring gear R (and also output gear 31). A reaction torque generated by first motor generator 21 acts on sun gear S. Ring gear R outputs a torque to output gear 31.

Drive device 40 includes a driven gear 41, a countershaft 42, a drive gear 43, and a differential gear 44. Differential gear 44 corresponds to a final reduction gear and has a ring gear 45. Drive device 40 further includes drive shafts 46 and 47, an oil pump 48, and an electric oil pump 49.

Driven gear 41 is meshed with output gear 31 coupled to ring gear R of planetary gear mechanism 30. Driven gear 41 is also meshed with a drive gear 222 attached to rotor shaft 221 of second motor generator 22. Countershaft 42 is attached to driven gear 41 and is arranged in parallel with axis Cnt. Drive gear 43 is attached to countershaft 42 and is meshed with ring gear 45 of differential gear 44. In drive device 40 having the configuration described above, driven gear 41 operates to combine a torque output from second motor generator 22 to rotor shaft 221 and a torque output from ring gear R included in planetary gear mechanism 30 to output gear 31. A resultant drive torque is transmitted to driving wheel 50 through drive shafts 46 and 47 extending laterally from differential gear 44.

Oil pump 48 is, for example, a mechanical oil pump. Oil pump 48 is provided coaxially with output shaft 101 of engine 10 and is driven by engine 10. Oil pump 48 feeds a lubricant to planetary gear mechanism 30, first motor generator 21, second motor generator 22, and differential gear 44 while engine 10 is operating.

Electric oil pump 49 is driven by electric power supplied from battery 70 or another vehicle-mounted battery (e.g., auxiliary battery), which is not shown. Electric oil pump 49 feeds a lubricant to planetary gear mechanism 30, first motor generator 21, second motor generator 22, and differential gear 44 while engine 10 is at rest.

PCU 60 converts DC power stored in battery 70 into AC power and supplies the AC power to first motor generator 21 and second motor generator 22, in response to a control signal from ECU 100. PCU 60 also converts AC power generated by first motor generator 21 and second motor generator 22 into DC power and supplies the DC power to battery 70. PCU 60 includes a first inverter 61, a second inverter 62, and a converter 63.

First inverter 61 converts a DC voltage into an AC voltage and drives first motor generator 21, in response to a control signal from ECU 100. Second inverter 62 converts a DC voltage into an AC voltage and drives second motor generator 22, in response to a control signal from ECU 100. Converter 63 steps up a voltage supplied from battery 70 and supplies the voltage to first inverter 61 and second inverter 62, in response to a control signal from ECU 100. Converter 63 also steps down a DC voltage from either one or both of first inverter 61 and second inverter 62 and charges battery 70, in response to a control signal from ECU 100.

Battery 70 includes a secondary battery, such as a lithium ion secondary battery or a nickel-hydrogen battery. The battery may be a capacitor, such as an electric double layer capacitor. Battery 70 corresponds to the "power storage device" according to the present disclosure.

ECU 100 is composed of, for example, a central processing unit (CPU, which may be simply referred to as a processor), a memory such as a read only memory (ROM) and/or a random access memory (RAM), I/O ports, and a counter, all of which are not shown. The CPU executes a control program. The memory stores, for example, various control programs and maps. The I/O ports control the transmission and reception of various signals. The counter counts a time. ECU 100 outputs a control signal and controls various devices such that vehicle 1 enters the desired state, based on a signal input from each sensor (described below) and the control program and map stored in the memory. Examples of main control (or processes) performed by ECU 100 include a "maximum torque determination process" of determining a maximum torque that can be output from engine 10 and "cooperative control" of cooperatively controlling engine 10, first motor generator 21, and second motor generator 22. Such control will be described below in detail.

<Configuration of Engine>

Figure 2:
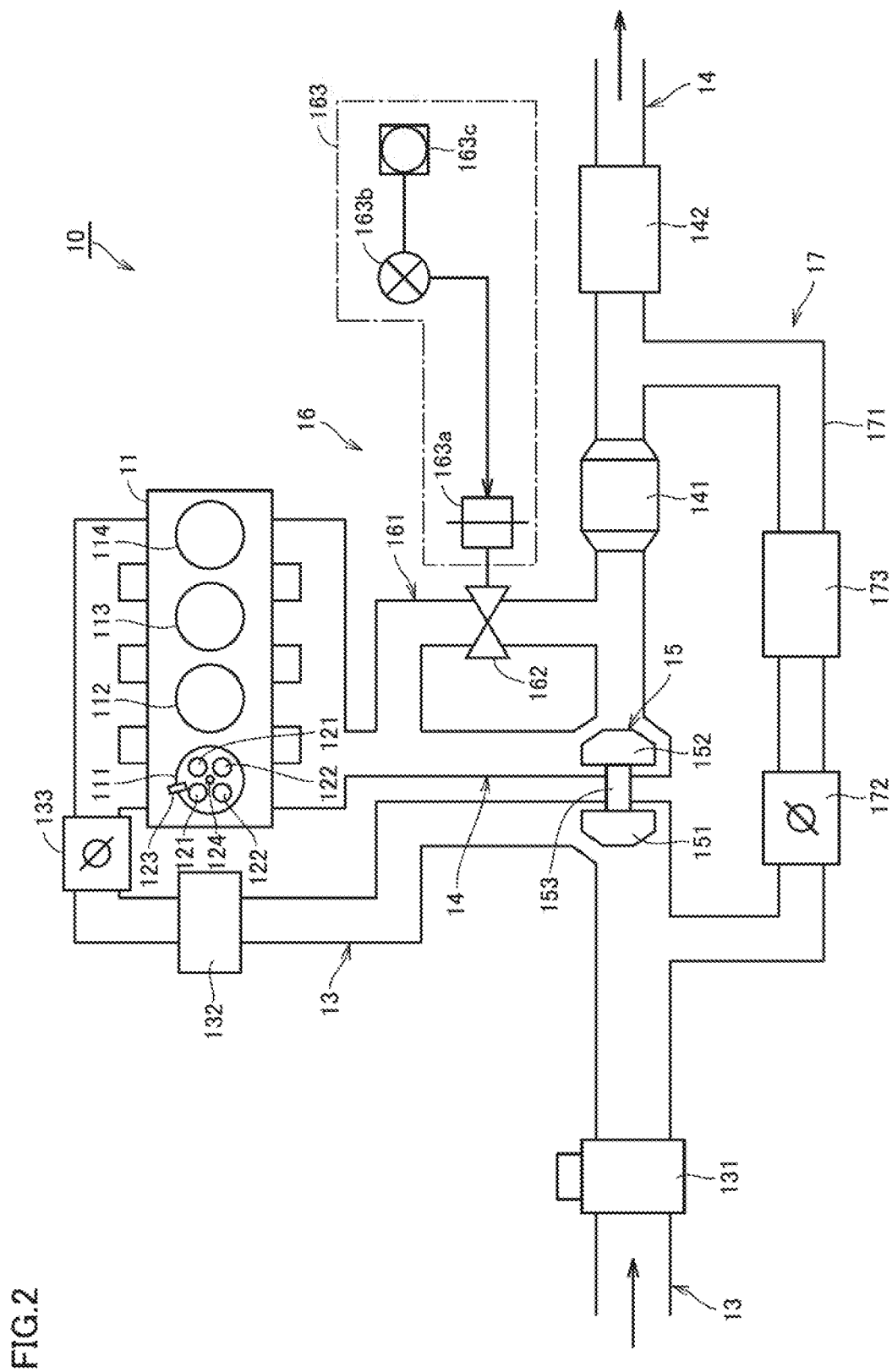
FIG. 2 shows an example configuration of an engine.

FIG. 2 shows an example configuration of engine 10. Referring to FIG. 2, engine 10 is, for example, an in-line four-cylinder spark ignition internal combustion engine. Engine 10 includes an engine main body 11. Engine main body 11 includes four cylinders 111 to 114. Four cylinders 111 to 114 are aligned in one direction. Since cylinders 111 to 114 have the same configuration, the configuration of cylinder 111 will be representatively described below.

Cylinder 111 is provided with two intake valves 121, two exhaust valves 122, an injector 123, and an ignition plug 124. Cylinder 111 is connected with an intake air passage 13 and an exhaust passage 14. Intake air passage 13 is opened and closed by intake valves 121. Exhaust passage 14 is opened and closed by exhaust valves 122. Fuel (e.g., gasoline) is added to air supplied through intake air passage 13 to engine main body 11, thus generating an air-fuel mixture of the air and the fuel. The fuel is injected in cylinder 111 by injector 123, thus generating the air-fuel mixture in cylinder 111. Then, ignition plug 124 ignites the air-fuel mixture in cylinder 111. Thus, the air-fuel mixture is burned in cylinder 111. The combustion energy generated through the combustion of the air-fuel mixture in cylinder 111 is converted into kinetic energy by a piston (not shown) within cylinder 111 and is output to output shaft 101 (see FIG. 1).

LSPI is likely to occur in an engine that performs an in-cylinder injection. Fuel injected from the in-cylinder injection valve (injector 123) is easily mixed with the oil on the wall surface of the cylinder before evaporation, which accelerates fuel dilution of the oil. As fuel dilution of the oil progresses, the surface tension of an oil film formed on the wall surface of the cylinder decreases, and accordingly, the oil film turns into a drop of oil, which is easily scattered in the combustion chamber. However, this phenomenon applies not only to an engine including only an in-cylinder injection valve but also to an internal-combustion engine including an in-cylinder injection valve and a port injection valve. The fuel supply system of engine 10 is thus not limited to the in-cylinder injection and may be in-cylinder injection and port injection used together.

Engine 10 further includes a turbo forced induction device 15. Forced induction device 15 uses exhaust energy to boost suctioned air. Forced induction device 15 includes a compressor 151, a turbine 152, and a shaft 153.

Forced induction device 15 uses exhaust energy to rotate turbine 152 and compressor 151, thereby boosting suctioned air (i.e., increasing the density of air suctioned into engine main body 11). More specifically, compressor 151 is disposed in intake air passage 13, and turbine 152 is disposed in exhaust passage 14. Compressor 151 and turbine 152 are coupled to each other with shaft 153 therebetween to rotate together. Turbine 152 rotates by a flow of exhaust discharged from engine main body 11. The rotative force of turbine 152 is transmitted to compressor 151 through shaft 153 to rotate compressor 151. The rotation of compressor 151 compresses intake air that flows toward engine main body 11, and the compressed air is supplied to engine main body 11.

Upstream of compressor 151 in intake air passage 13, an air flow meter 131 is provided. Downstream of compressor 151 in intake air passage 13, an intercooler 132 is provided. Downstream of intercooler 132 in intake air passage 13, a throttle valve (intake throttle valve) 133 is provided. Thus, air that flows into intake air passage 13 is supplied to each of cylinders 111 to 114 of engine main body 11 through air flow meter 131, compressor 151, intercooler 132, and throttle valve 133 in the stated order.

Air flow meter 131 outputs a signal corresponding to a flow rate of air that flows through intake air passage 13. Intercooler 132 cools intake air compressed by compressor 151. Throttle valve 133 can regulate a flow rate of intake air that flows through intake air passage 13.

Downstream of turbine 152 in exhaust passage 14, a start-up catalyst converter 141 and an aftertreatment device 142 are provided. Further, exhaust passage 14 is provided with a waste gate valve (WGV) device 16. WGV device 16 can flow exhaust discharged from engine main body 11 while diverting the exhaust around turbine 152 and regulate the amount of exhaust to be diverted. WGV device 16 includes a bypass passage 161, a WGV 162, and a WGV actuator 163.

Bypass passage 161 is connected to exhaust passage 14 and flows exhaust while diverting the exhaust around turbine 152. Specifically, bypass passage 161 is branched from a portion upstream of turbine 152 in exhaust passage 14 (e.g., between engine main body 11 and turbine 152) and meets a portion downstream of turbine 152 in exhaust passage 14 (e.g., between turbine 152 and start-up catalyst converter 141).

WGV 162 is disposed in bypass passage 161. WGV 162 can regulate a flow rate of exhaust guided from engine main body 11 to bypass passage 161 depending on its opening. As WGV 162 is closed by a larger amount, the flow rate of exhaust guided from engine main body 11 to bypass passage 161 decreases, whereas the flow rate of exhaust that flows into turbine 152 increases, leading to a higher pressure of suctioned air (i.e., boost pressure).

WGV 162 is a negative-pressure valve driven by WGV actuator 163. WGV actuator 163 includes a negative-pressure-driven diaphragm 163a, a negative pressure regulating valve 163b, and a negative pressure pump 163c.

Diaphragm 163a is coupled to WGV 162. WGV 162 is driven by a negative pressure introduced into diaphragm 163a. In the present embodiment, WGV 162 is a normally closed valve, and the opening of WGV 162 increases as a higher negative pressure acts on diaphragm 163a.

Negative pressure regulating valve 163b can adjust the magnitude of a negative pressure acting on diaphragm 163a. A larger opening of negative pressure regulating valve 163b leads to a higher negative pressure acting on diaphragm 163a. Negative pressure regulating valve 163b can be, for example, a two position electromagnetic valve that can be alternatively selected to be fully open or fully closed.

Negative pressure pump 163c is connected to diaphragm 163a with pressure-regulating valve 163b therebetween. Negative pressure pump 163c is a mechanical pump (e.g., vane-type mechanical pump) driven by engine 10. Negative pressure pump 163c uses the motive power output to output shaft 101 of engine 10 (see FIG. 1) to generate a negative pressure. Negative pressure pump 163c becomes activated while engine 10 is operating, and when engine 10 stops, negative pressure pump 163c also stops. Note that WGV 162 is not necessarily a valve of diaphragm negative pressure type and may be a valve driven by an electric actuator.

Exhaust discharged from engine main body 11 passes through any one of turbine 152 and WGV 162. Each of start-up catalyst converter 141 and aftertreatment device 142 includes, for example, a three-way catalyst and removes a hazardous substance in the exhaust. More specifically, since start-up catalyst converter 141 is provided at an upstream portion (a portion close to the combustion chamber) of exhaust passage 14, its temperature rises to the activation temperature in a short period of time after startup of engine 10. Aftertreatment device 142 located downstream purifies HC, CO, and NOx that were not purified by start-up catalyst converter 141.

Engine 10 is provided with an exhaust gas recirculation (EGR) device 17. EGR device 17 causes exhaust to flow into intake air passage 13. EGR device 17 includes an EGR passage 171, an EGR valve 172, and an EGR cooler 173.

EGR passage 171 connects a portion between start-up catalyst converter 141 and aftertreatment device 142 in exhaust passage 14 and a portion between compressor 151 and air flow meter 131 in intake air passage 13 to each other. EGR passage 171 takes out part of the exhaust from exhaust passage 14 as EGR gas and guides the EGR gas to intake air passage 13. EGR valve 172 can regulate the flow rate of EGR gas that flows through EGR passage 171. EGR cooler 173 cools EGR gas that flows through EGR passage 171.

<Configuration of Control System>

Figure 3:
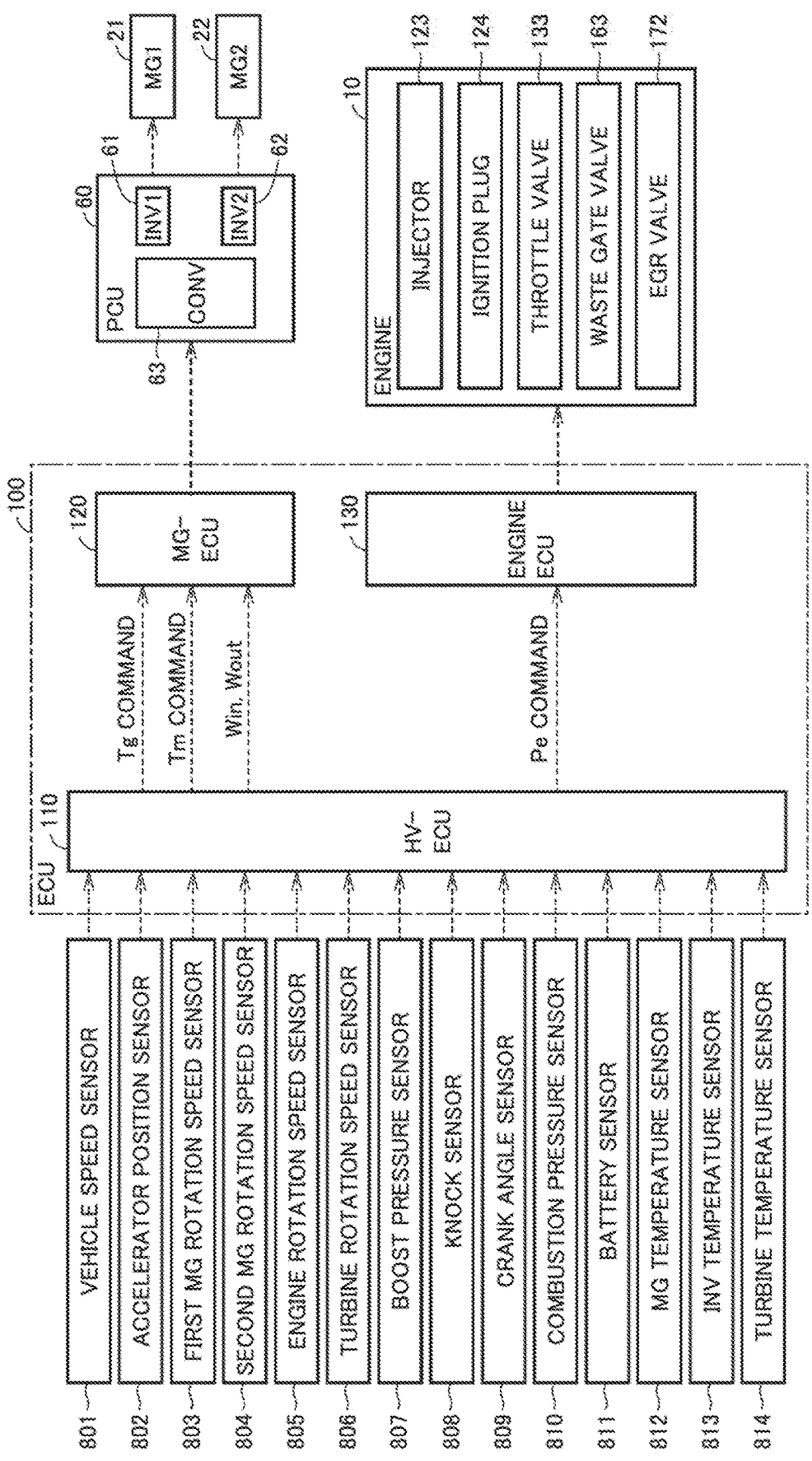
FIG. 3 shows an example configuration of a control system of a vehicle.

FIG. 3 shows an example configuration of a control system of vehicle 1. Referring to FIG. 3, vehicle 1 includes a vehicle speed sensor 801, an accelerator position sensor 802, a first motor generator rotation speed sensor 803, a second motor generator rotation speed sensor 804, an engine rotation speed sensor 805, a turbine rotation speed sensor 806, a boost pressure sensor 807, a knock sensor 808, a crank angle sensor 809, a combustion pressure sensor 810, a battery sensor 811, a motor generator temperature sensor 812, an inverter temperature sensor 813, and a turbine temperature sensor 814. ECU 100 includes an HV-ECU 110, an MG-ECU 120, and an engine ECU 130.

Vehicle speed sensor 801 detects a speed of vehicle 1. Accelerator position sensor 802 detects an amount of pressing of an accelerator pedal. First motor generator rotation speed sensor 803 detects a rotation speed of first motor generator 21. Second motor generator rotation speed sensor 804 detects a rotation speed of second motor generator 22. Engine rotation speed sensor 805 detects a rotation speed of output shaft 101 of engine 10. Turbine rotation speed sensor 806 detects a rotation speed of turbine 152 of forced induction device 15. Boost pressure sensor 807 detects a boost pressure by forced induction device 15 (a pressure downstream of compressor 151). Knock sensor 808 detects an occurrence of knocking in engine 10 (vibrations of engine main body 11). Crank angle sensor 809 detects a rotation angle of the crankshaft (not shown) of engine 10. Combustion pressure sensor 810 detects a pressure in a combustion chamber (combustion pressure), which is not shown. Battery sensor 811 detects a voltage across battery 70, currents supplied to and output from battery 70, and a temperature of battery 70. Motor generator temperature sensor 812 detects temperatures of first motor generator 21 and second motor generator 22 (e.g., temperatures related to coils or magnets of first motor generator 21 and second motor generator 22). Inverter temperature sensor 813 detects temperatures of first inverter 61 and second inverter 62 (e.g., temperatures related to switching elements). Turbine temperature sensor 814 detects a temperature of turbine 152. Each sensor outputs a signal indicating a detection result to HV-ECU 110.

HV-ECU 110 cooperatively controls engine 10, first motor generator 21, and second motor generator 22 (cooperative control). First, HV-ECU 110 determines a requested driving force in accordance with, for example, an accelerator position and a vehicle speed and calculates requested power of engine 10 from the requested driving force. HV-ECU 110 determines, from the requested power of engine 10, an engine operating point (a combination of an engine rotation speed Ne and an engine torque Te) at which, for example, the smallest fuel consumption of engine 10 is obtained. HV-ECU 110 then outputs various commands such that engine 10 operates at the engine operating point. Specifically, HV-ECU 110 outputs, to MG-ECU 120, a command (Tg command) for instructing a torque Tg to be generated by first motor generator 21 and a command (Tm command) for instructing a torque Tm to be generated by second motor generator 22. HV-ECU 110 also outputs, to engine ECU 130, a command (Pe command) for instructing power (engine power) Pe to be generated by engine 10.

Based on the commands (Tg command and Tm command) from HV-ECU 110, MG-ECU 120 generates signals for driving first motor generator 21 and second motor generator 22 and outputs the signals to PCU 60. Engine ECU 130 controls each component of engine 10 (e.g., injector 123, ignition plug 124, throttle valve 133, WGV 162, EGR valve 172) based on the Pe command from HV-ECU 110.

HV-ECU 110 requests boosting of suctioned air by forced induction device 15 or requests an increase in boost pressure along with an increase in engine torque Te. A boost request (and a boost pressure increase request) is output to engine ECU 130. Engine ECU 130 controls WGV 162 in accordance with the boost request from HV-ECU 110.

Further, in vehicle 1, restrictions are put on charging and discharging power of battery 70 to protect battery 70. HV-ECU 110 calculates a charging power upper limit Win, which is a control upper limit of charging power to battery 70, and a discharge power upper limit Wout, which is a control upper limit of discharging power from battery 70. HV-ECU 110 outputs a command for instructing the calculated charging power upper limit Win and discharge power upper limit Wout to MG-ECU 120. MG-ECU 120 controls PCU 60 such that the charging power to battery 70 does not exceed charging power upper limit Win and the discharging power from battery 70 does not exceed discharge power upper limit Wout.

FIG. 3 shows an example in which ECU 100 is configured separately for HV-ECU 110, MG-ECU 120, and engine ECU 130 by function. However, ECU 100 is not necessarily configured separately by function and may include one or two ECUs. Hereinbelow, HV-ECU 110, MG-ECU 120, and engine ECU 130 may not be particularly distinguished from each other, and a control main part of vehicle 1 may be collectively referred to as ECU 100 in the following description.

<Engine Operating Point and LSPI>

Figure 4:
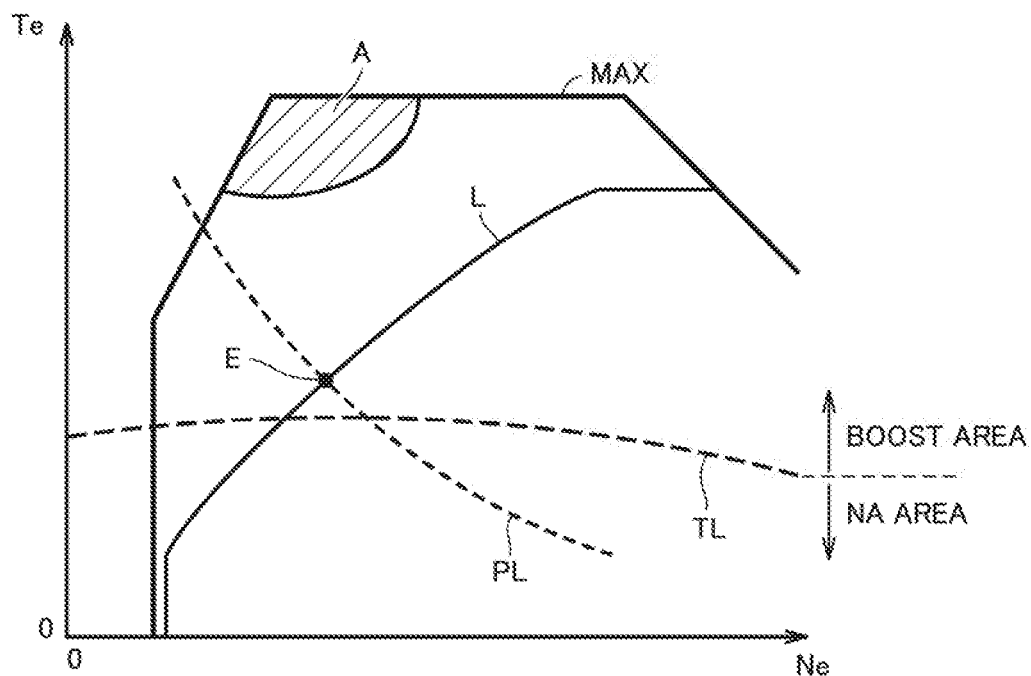
FIG. 4 is a diagram for illustrating an example operation of the engine using a plane of coordinates of engine rotation speed and engine torque.
Figure 5:
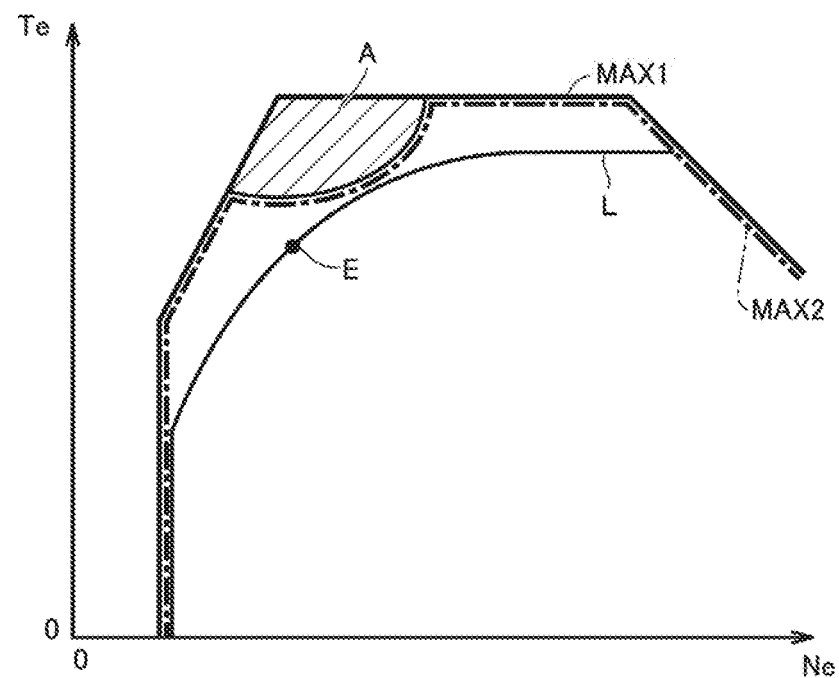
FIG. 5 is a diagram for illustrating a maximum torque determination process in the present embodiment.

FIG. 4 is a diagram for illustrating an example operation of engine 10 using a plane of coordinates of engine rotation speed Ne and engine torque Te. In FIG. 4 and FIG. 5, which will be described below, the axis of abscissa represents engine rotation speed Ne, and the axis of ordinate represents engine torque Te.

Referring to FIG. 4, engine 10 is normally controlled such that an engine operating point moves on a recommended operation line L set in advance. In the example shown in FIG. 4, recommended operation line L is an optimum fuel efficiency line connecting operating points at which the smallest fuel efficiency of vehicle 1 is obtained. Recommended operation line L is located below a maximum torque line MAX indicating a maximum torque that can be output by engine 10.

Engine 10 is controlled to move on an equal power line PL on which engine power Pe is equal to requested engine power. ECU 100 sets an intersection of recommended operation line L and equal power line PL as a target operating point (which is shown as an engine operating point E in FIG. 4).

Further, engine 10 is controlled in accordance with a "boost line TL" on which forced induction device 15 starts boosting suctioned air. The area above boost line TL is a boost area, and the area below boost line TL is a natural aspiration (NA) area. Engine ECU 130 requests boosting of suctioned air by forced induction device 15 when torque (engine torque) Te of engine 10 exceeds a predetermined level (boost line TL shown in FIG. 4) as, for example, the accelerator pedal is pressed. While engine torque Te falls below boost line TL, WGV 162 can be fully opened to cause forced induction device 15 to become inactivated.

As described above, low speed pre-ignition (LSPI) causes torque fluctuation and strange sound, which may lead to exacerbated comfort (drivability) of a vehicle 1. Further, repeated occurrence of LSPI may lead to further deterioration of engine 10. Typically, LSPI is likely to occur particularly in a low-rotation, high-load area. This area will be referred to as an "LSPI area" below. In FIG. 4, LSPI area A in engine 10 of vehicle 1 according to the present embodiment is diagonally shaded.

Engine 10 is provided with forced induction device 15. Vehicle 1 thus more frequently increases engine torque Te in an area with low engine rotation speed Ne than a vehicle including an engine provided with no forced induction device. In other words, engine operating point E is more likely to move into LSPI area A.

Generally, addition of an octane booster to fuel increases an octane rating of the fuel, leading to satisfactory anti-nock properties. An example of such an octane booster is an organic metal compound. The organic metal compound includes manganese, iron, lead, or the like. Fuel containing an organic metal compound including manganese will be referred to as "high manganese fuel" below. Note that an organic metal compound including a metal other than manganese may be added to the fuel as the octane booster.

The distillation profile of the high manganese fuel may change, and the fuel may have a high maximum distillation temperature compared with fuel containing no organic metal compound including manganese. An amount of generated hydrocarbon exhaust gas increases at a higher maximum distillation temperature, so that LSPI may be more likely to occur (see Japanese National Patent Publication No. 2019-504920).

In view of the above, in the present embodiment, control of engine operating point E is switched in accordance with fuel properties. More specifically, ECU 100 determines a maximum torque output from engine 10, in accordance with fuel properties. This process is referred to as a "maximum torque determination process". In the maximum torque determination process, ECU 100 first determines whether fuel is high manganese fuel (whether an octane booster is added to the fuel), based on vibrations of engine 10 or combustion pressure. Then, when determining that fuel is high manganese fuel, ECU 100 restricts an area in which engine operating point E is movable by changing a maximum torque line, thus prohibiting engine operating point E from moving to LSPI area A.

<Maximum Torque Determination Process>

FIG. 5 is a diagram for illustrating the maximum torque determination process in the present embodiment. Referring to FIG. 5, in the maximum torque determination process, a "first maximum torque line MAX1" is set when fuel is not high manganese fuel (or before it is determined that fuel is high manganese fuel). First maximum torque line MAX1 is a torque line similar to maximum torque line MAX shown in FIG. 4.

In contrast, when it is determined that fuel is high manganese fuel, a maximum torque line different from first maximum torque line MAX1 is set. This line is referred to as a "second maximum torque line MAX2". Second maximum torque line MAX2 is set so as not to include LSPI area A based on the initial assessment results (specifications of engine 10).

ECU 100 controls engine operating point E such that engine torque Te does not exceed second maximum torque line MAX2. More specifically, in vehicle 1, engine operating point E can be changed by controlling engine 10 and first motor generator 21. A final vehicle driving force is adjustable by controlling second motor generator 22. Through cooperative control of engine 10, first motor generator 21, and second motor generator 22 as described above, a desired vehicle driving force can be obtained even when engine operating point E is moved to outside of LSPI area A in such a situation that engine operating point E would be controlled to be located in LSPI area A if fuel is not high manganese fuel.

<Wout Control>

When second maximum torque line MAX2 is set to restrict (restrain) an increase in engine torque Te, increasing an outflow (discharging power) from battery 70 may be required for obtaining desired vehicle driving power. When discharge from battery 70 is restricted because it has reached discharge power upper limit Wout, however, the discharging power from battery 70 cannot be increased further. In the present embodiment, thus, discharge power upper limit Wout is also switched in accordance with fuel properties.

Figure 6:
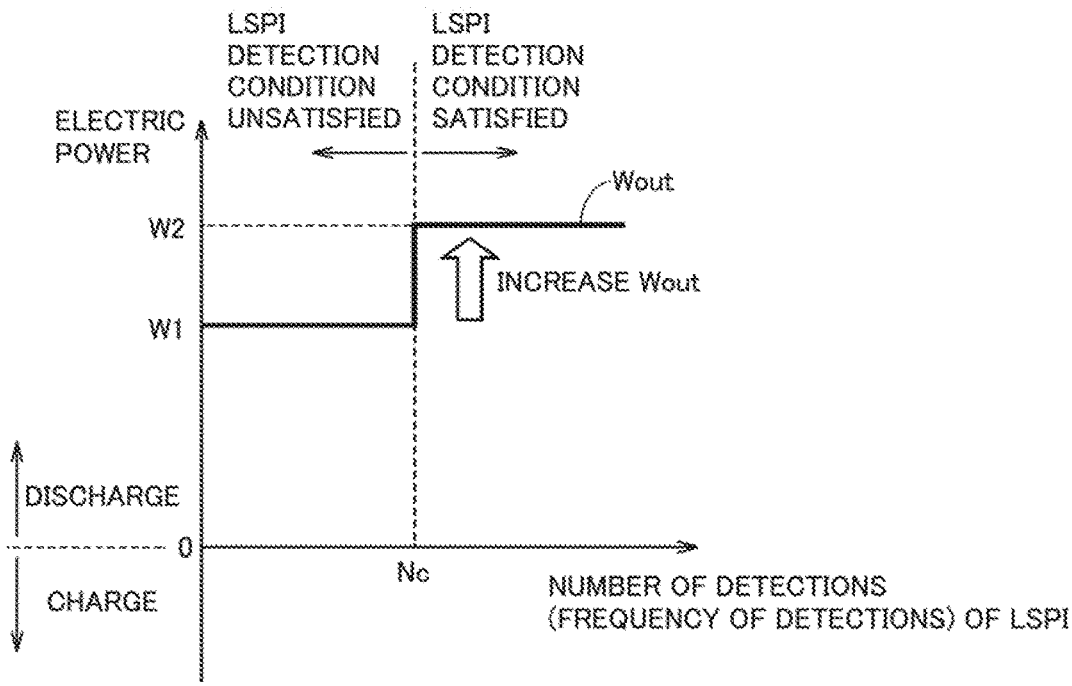
FIG. 6 is a diagram for illustrating a process of calculating a discharge power upper limit in the present embodiment.

FIG. 6 is a diagram for illustrating a process of calculating discharge power upper limit Wout in the present embodiment. In FIG. 6, the axis of abscissa represents the number of detections (an integrated value of the number of detections or frequency of detections described below) of LSPI in engine 10, and the axis of ordinate represents electric power of battery 70. The direction of discharge of battery 70 is the positive direction.

Referring to FIG. 6, when the number of detections of LSPI in engine 10 falls below a predetermined number of times Nc, ECU 100 determines that fuel is not high manganese fuel and then sets discharge power upper limit Wout of battery 70 to a normal value W1.

Contrastingly, when the number of detections of LSPI exceeds predetermined number of times Nc, ECU 100 determines that fuel is high manganese fuel and then sets discharge power upper limit Wout (absolute value) of battery 70 to a value W2 greater than normal value W1. In other words, ECU 100 relaxes restrictions on discharging power from battery 70 by increasing discharge power upper limit Wout. This can more reliably compensate for an insufficient amount of engine power Pe, which is attributable to a change of second maximum torque line MAX2 (restrictions on maximum torque), with discharging power from battery 70.

Discharge power upper limit Wout may be set in accordance with a state of charge (SOC) or temperature of battery 70 while a relationship W1<W2 is maintained. Specifically, when battery 70 is in a low SOC state, W1 and W2 can be set to be smaller than when battery 70 is in a higher SOC state. When battery 70 is at a very low temperature, W1 and W2 can be set to be smaller than when battery 70 is at a higher temperature.

<Control Flow>

Figure 7:
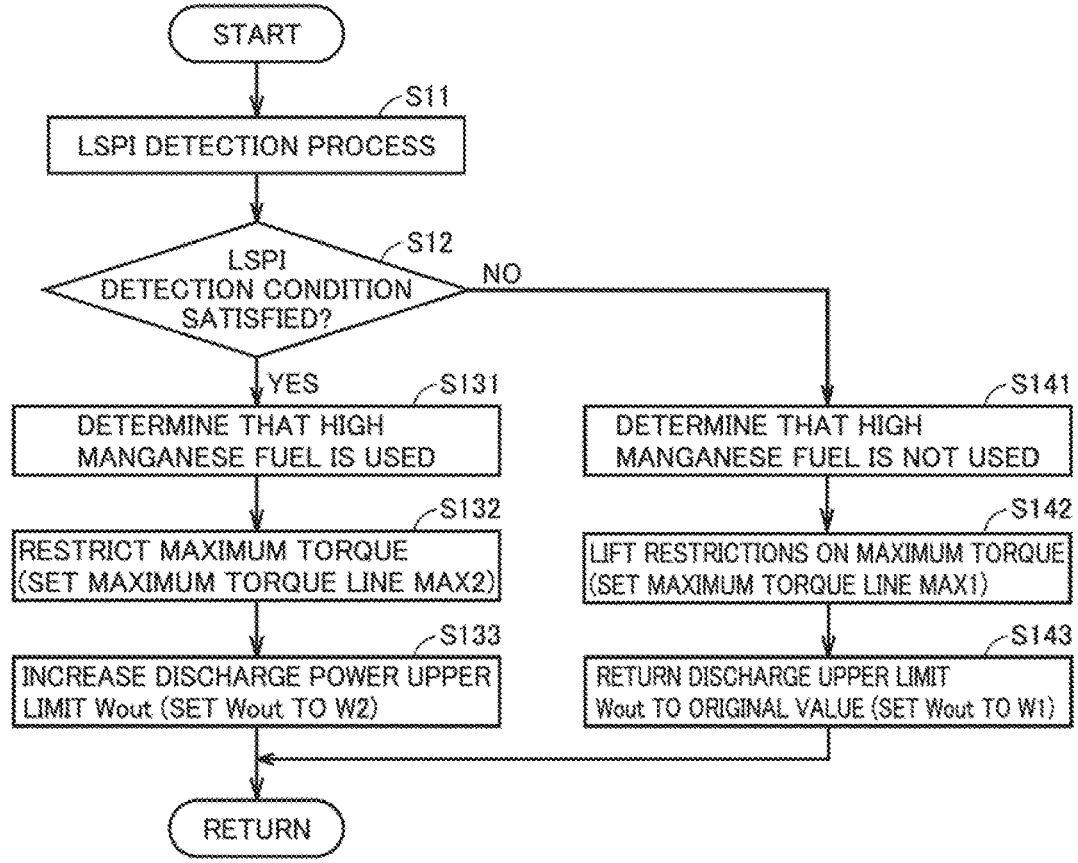
FIG. 7 is a flowchart showing an example maximum torque determination process in the present embodiment.

FIG. 7 is a flowchart showing an example maximum torque determination process in the present embodiment. A series of processes shown in the flowcharts of FIG. 7 and FIG. 8, which will be described below, are repeatedly performed for each predetermined control period in HV-ECU 110. Each step (hereinafter abbreviated as S) is basically implemented through a software process by HV-ECU 110, which may be implemented through a hardware process by an electronic circuit fabricated in HV-ECU 110.

Referring to FIG. 7, at S11, HV-ECU 110 performs a process for detecting an occurrence of LSPI in engine 10. For example, HV-ECU 110 detects LSPI based on detection signals from knock sensor 808 and crank angle sensor 809. Whether vibrations detected by knock sensor 808 are due to knocking or LSPI can be determined based on the intensity of vibrations and a crank angle detected by crank angle sensor 809. In any other case, the pressure in the combustion chamber (combustion pressure) rises abnormally as LSPI occurs. HV-ECU 110 can thus detect LSPI based on the combustion pressure detected by combustion pressure sensor 810 (see Japanese Patent Laying-Open No. 2017-2781). Knock sensor 808, crank angle sensor 809, and combustion pressure sensor 810 correspond to a "sensor" according to the present disclosure.

Though not shown, in the configuration in which the detection signals from knock sensor 808 and crank angle sensor 809 are output to engine ECU 130 in place of HV-ECU 110, engine ECU 130 detects an occurrence of LSPI in engine 10. In this case, a signal indicating the occurrence of LSPI (a signal indicating the number or frequency of detections of LSPI) is output from engine ECU 130 to HV-ECU 110.

A possibility of false detection cannot be denied by merely detecting the occurrence of LSPI once. HV-ECU 110 thus determines, at S12, whether an LSPI detection condition is satisfied based on the process result at S11. Specifically, HV-ECU 110 calculates an integrated value of the number of detections of LSPI from the last refueling. Alternatively, HV-ECU 110 may calculate the frequency of detections (e.g., moving average of detections) of LSPI in a previous predetermined period (e.g., several weeks to several months). Then, when the integrated value of the number of detections of LSPI from the last refueling is greater than a predetermined value (when a first condition is satisfied) or when the frequency of detections of LSPI in the last predetermined period is greater than a predetermined frequency (when a second condition is satisfied), HV-ECU 110 determines that the LSPI detection condition is satisfied. Otherwise, HV-ECU 110 determines that the LSPI detection condition is unsatisfied.

When the LSPI detection condition is satisfied (YES at S12), HV-ECU 110 determines that high manganese fuel is used and LSPI is likely to occur (S131). Then, HV-ECU 110 sets second maximum torque line MAX2 (S132). Consequently, a maximum torque that can be output from engine 10 is restricted more than when first maximum torque line MAX1 is set.

At the same time, HV-ECU 110 sets discharge power upper limit Wout of battery 70 to W2 (S133). Value W2 is greater than value W1 during normal operation, as described with reference to FIG. 6. This increases maximum electric power that can be discharged from battery 70, thus enhancing discharge capability of battery 70.

Contrastingly, when the LSPI detection condition is unsatisfied at S12 (NO at S12), HV-ECU 110 determines that high manganese fuel is not used for vehicle 1 and LSPI is unlikely to occur (S141). In this case, HV-ECU 110 sets first maximum torque line MAX1 during normal operation (S142). When second maximum torque line MAX2 has already been set through the previous process, the restrictions on the maximum torque that can be output from engine 10 are lifted by setting first maximum torque line MAX1.

Further, HV-ECU 110 sets discharge power upper limit Wout of battery 70 to normal value W1 (S143). When discharge power upper limit Wout of battery 70 has been set to a large value W2 at S133 (when discharge capability of battery 70 has been enhanced), discharge power upper limit Wout is returned to an original value. Upon completion of the processes at S133 and S143, HV-ECU 110 returns the process to a main routine.

FIG. 8 is a flowchart showing example cooperative control in the present embodiment. Referring to FIG. 8, at S21, ECU 100 obtains information, such as an accelerator position, a shift range being selected, and a vehicle speed. The accelerator position is detected by accelerator position sensor 802, and the vehicle speed is detected by vehicle speed sensor 801. The rotation speed of a drive shaft or a propeller shaft may be used in place of the vehicle speed.

At S22, HV-ECU 110 calculates a requested driving force (torque) from the information obtained at S21 using a driving force map (not shown) which is prepared for each shift range and indicates the relationship among requested driving force, accelerator position, and vehicle speed. HV-ECU 110 then multiplies the calculated requested driving force by the vehicle speed and adds predetermined loss power to the result of the multiplication to calculate traveling power of the vehicle (S23).

At S24, when there is a charge and discharge request (power) of battery 70, HV-ECU 110 calculates, as system power, a value obtained by adding the charge and discharge request (positive values for charging) to the calculated traveling power.

At S25, HV-ECU 110 determines whether to operate or stop engine 10 based on the calculated system power and traveling power. For example, when the system power is greater than a first threshold or when the traveling power is greater than a second threshold, HV-ECU 110 determines to operate engine 10. When determining to operate engine 10, HV-ECU 110 performs the processes of step S27 and subsequent steps (HV traveling mode). Though not specifically shown, when determining to stop engine 10 (EV traveling mode), HV-ECU 110 calculates a torque Tm of second motor generator 22 based on the requested driving force.

During operation of engine 10 (during HV traveling), at S26, HV-ECU 110 calculates power (engine power) Pe of engine 10 from the system power calculated at S24. Engine power Pe is calculated through various corrections, restrictions, or the like performed on the system power. The calculated engine power Pe is output to engine ECU 130 as a power command of engine 10.

At S27, HV-ECU 110 calculates a target engine rotation speed Ne*. In the present embodiment, target engine rotation speed Ne* is calculated such that engine operating point E is located on recommended operation line L, as described above. Specifically, the relationship between engine power Pe and engine rotation speed Ne, in which engine operating point E is located on recommended operation line L, is prepared as a map or the like in advance, and the map is used to calculate target engine rotation speed Ne* from engine power Pe calculated at S26. Upon determination of target engine rotation speed Ne*, target engine torque Te* is determined as well. Consequently, engine operating point E is determined.

At S28, HV-ECU 110 calculates a torque (first MG torque) Tg of first motor generator 21. Engine torque Te can be estimated from engine rotation speed Ne, and the relationship between engine torque Te and first MG torque Tg is determined uniquely from the gear ratio of planetary gear mechanism 30. Thus, first MG torque Tg can be calculated from engine rotation speed Ne. The calculated first MG torque Tg is output to MG-ECU 120 as a torque command of first motor generator 21.

At S29, HV-ECU 110 calculates an engine direct torque Tep. The relationship between engine direct torque Tep and engine torque Te (or first MG torque Tg) is determined uniquely from the gear ratio of planetary gear mechanism 30, and accordingly, engine direct torque Tep can be calculated from engine torque Te (or first MG torque Tg).

Finally, HV-ECU 110 calculates a torque (second MG torque) Tm of second motor generator 22 (S30). Second MG torque Tm is determined so as to achieve the requested driving force (torque) calculated at S22. Specifically, second MG torque Tm can be calculated by subtracting engine direct torque Tep from the requested driving force converted on the output shaft. The calculated second MG torque Tm is output to MG-ECU 120 as a torque command of second motor generator 22.

As described above, engine operating point E, the operating point of first motor generator 21, and the operating point of second motor generator 22 are calculated. A corresponding device is controlled in accordance with each of the calculated operating points.

When engine operating point E is included in LSPI area A at the point when it is determined that the LSPI detection condition is satisfied in FIG. 7, HV-ECU 110 moves operating point E to outside of LSPI area A. For example, HV-ECU 110 moves operating point E such that engine torque Te decreases while limiting changes in engine rotation speed Ne. Although engine power Pe decreases as operating point E is moved such that engine torque Te decreases, an amount of the decrease in engine power Pe can be compensated for by increasing the discharging power from battery 70 correspondingly. Also, limiting changes in engine rotation speed Ne can reduce the sense of discomfort associated with the changes in operating point E (changes in engine rotation speed Ne which are unintended by the user).

In the present embodiment, it is determined that fuel is (or is highly likely to be) high manganese fuel when an occurrence of LSPI is detected, as described above. When the engine operating point moves into LSPI area A during use of high manganese fuel, a probability of occurrence of LSPI will increase further. Thus, ECU 100 sets a maximum torque line (second maximum torque line MAX2) different from that during normal operation. Engine 10 is controlled such that engine torque Te does not exceed second maximum torque line MAX2, thus avoiding movement of the engine operating point into LSPI area A. The present embodiment can thus restrain an excessive occurrence of LSPI. Also, in vehicle 1 which is a hybrid vehicle, an insufficient amount of engine power Pe, attributable to the setting of second maximum torque line MAX2, can be compensated for by the discharging power from battery 70.

The present embodiment has described the example in which forced induction device 15 is a turbocharger that boosts suctioned air with the use of exhaust energy. Forced induction device 15, however, may be such a type of mechanical supercharger that drives a compressor with the use of the rotation of engine 10.

Although an embodiment of the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A hybrid vehicle comprising:
an engine including a forced induction device, the engine serving as a motive power source of the hybrid vehicle;
a sensor that detects an occurrence of low speed pre-ignition in the engine;
a rotating electric machine that serves as a motive power source of the hybrid vehicle;
a power storage device that supplies electric power to the rotating electric machine; and
a controller that controls the engine and the rotating electric machine, wherein
when an occurrence of the low speed pre-ignition is detected, the controller restricts a maximum torque more than when an occurrence of the low speed pre-ignition is not detected to prevent an operating point of the engine from moving into a predetermined area, the predetermined area is an area with low rotation and high load in which the low speed pre-ignition is likely to occur, and
when an output of the engine becomes insufficient along with the restriction on the maximum torque, the controller compensates for an amount of the insufficient output with electric power supplied from the power storage device, the maximum torque is capable of being output by the engine with the forced induction device.

2. The hybrid vehicle according to claim 1, wherein when an occurrence of the low speed pre-ignition is detected, the controller sets a control upper limit of electric power capable of being supplied to the rotating electric machine from the power storage device to be higher than when an occurrence of the low speed pre-ignition is not detected.

3. The hybrid vehicle according to claim 1, wherein
the controller determines that an occurrence of the low speed pre-ignition is detected when at least one of a first condition and a second condition is satisfied,
the first condition is a condition that a number of detections of the low speed pre-ignition from last refueling has exceeded a predetermined number of times, and
the second condition is a condition that a frequency of detections of the low speed pre-ignition in a predetermined period has exceeded a predetermined frequency.

4. A method of controlling a hybrid vehicle including an engine including a forced induction device, a rotating electric machine, and a power storage device that supplies electric power to the rotating electric machine, the method comprising:
detecting an occurrence of low speed pre-ignition in the engine; and
when the low speed pre-ignition is detected, restricting a maximum torque more than when the low speed pre-ignition is not detected such that an operating point of the engine does not move into a predetermined area, the predetermined area being an area with low rotation and high load in which the low speed pre-ignition is likely to occur, the maximum torque being capable of being output by the engine with the forced induction device,
wherein the restricting includes, when an output of the engine becomes insufficient along with the restriction on the maximum torque, compensating for an amount of the insufficient output with electric power supplied from the power storage device.

* * * * *